United States Patent [19]

Saur

[11] Patent Number: 5,781,876
[45] Date of Patent: Jul. 14, 1998

[54] CRUISE CONTROL ROAD SPEED CONTROL DEVICE, ESPECIALLY FOR A DIESEL-POWERED VEHICLE

[75] Inventor: Joerg Saur, Eislingen, Germany

[73] Assignee: Mercedes-Benz AG, Stuttgart, Germany

[21] Appl. No.: 552,875

[22] Filed: Nov. 3, 1995

[30] Foreign Application Priority Data

Nov. 4, 1994 [DE] Germany ............ 44 39 424.1

[51] Int. Cl.$^6$ ............................................. B60K 31/04
[52] U.S. Cl. ............ 701/93; 701/86; 701/103; 701/104; 123/357; 180/179
[58] Field of Search ............ 364/426.029, 426.031, 364/426.032, 431.051, 431.052, 426.041; 180/175, 179, 169; 123/357, 399

[56] References Cited

U.S. PATENT DOCUMENTS

| | | | |
|---|---|---|---|
| 4,157,126 | 6/1979 | Collonia | 180/105 E |
| 4,170,274 | 10/1979 | Collonia | 180/179 |
| 4,374,422 | 2/1983 | O'Keefe, Jr. et al. | 364/426 |
| 4,422,420 | 12/1983 | Cromas et al. | 123/352 |
| 4,561,517 | 12/1985 | Hilton et al. | 180/175 |
| 4,976,239 | 12/1990 | Hosaka | 123/399 |
| 5,019,986 | 5/1991 | Londt et al. | 364/426.04 |
| 5,062,404 | 11/1991 | Scotson et al. | 123/399 |
| 5,129,475 | 7/1992 | Kawano et al. | 180/179 |
| 5,201,296 | 4/1993 | Wunning et al. | 123/479 |
| 5,234,071 | 8/1993 | Kajiwara | 180/169 |
| 5,311,063 | 5/1994 | Hubler | 290/40 C |
| 5,357,912 | 10/1994 | Barnes et al. | 123/357 |
| 5,393,277 | 2/1995 | White et al. | 477/108 |

FOREIGN PATENT DOCUMENTS

| | | |
|---|---|---|
| 26 54 455 | 6/1978 | Germany. |
| 28 16 613 | 10/1979 | Germany. |

OTHER PUBLICATIONS

Article entitled "Elektronisches Gaspedal für Nutzfahrzeuge" (Electronic Accelerator for Commercial Vehicles). *Automobiltechnische Zeitschrift* 95 (1993) 2, p. 80, by G. Gils and A. Vokan.

Primary Examiner—Kevin J. Teska
Assistant Examiner—Russell W. Frejd
Attorney, Agent, or Firm—Evenson, McKeown, Edwards & Lenahan, P.L.L.C.

[57] ABSTRACT

A cruise control road speed control device provides an attenuating member connected between the speed control and the fuel injection volume adjusting member. The attenuating member feeds the controller output signal in a lower value range to the adjusting member after attenuation. This measure suppresses the undesired rpm oscillations and thus, even with cruise control operation at low engine loads, permits satisfactory driving comfort without perceptible juddering effects. The cruise control can be used for controlling the road speed of commercial vehicles with Diesel engines and automatic transmissions.

5 Claims, 1 Drawing Sheet

CRUISE CONTROL ROAD SPEED CONTROL DEVICE, ESPECIALLY FOR A DIESEL-POWERED VEHICLE

BACKGROUND AND SUMMARY OF THE INVENTION

The invention relates to a road speed control device in the form of a so-called cruise control for a motor vehicle having an internal combustion engine. The cruise control includes a speed controller and an adjusting element connected downstream for adjusting the amount of fuel to be injected.

A road speed controller of this kind for a commercial motor vehicle is described for example in the article "Elektronisches Gaspedal fur Nutzfahrzeugel" [Electronic Accelerator for Commercial Vehicles], Automobiltechnische Zeitschrift 95 (1993) 2, page 80, by G. Gils and A. Vokan. Cruise control systems are electrical devices for controlling vehicle speed. They are activated on demand by the driver, usually through the use of a cruise control operating lever provided for that purpose. Following activation, cruise control always begins at the load point set by the accelerator, i.e. with the corresponding volume of fuel injected in order for control to proceed without jerking or delay. Typically, the operating modes "set and accelerate," "set and decelerate," and "resume" can be set using the operating lever, with the vehicle speed changing in the desired manner during the operation of the operating lever and with the actual speed being established as the set speed for cruise control when the lever is released. The cruise control typically contains a $PDT_1$ control, whose output signal is fed to the input of the device that adjusts the volume of fuel injected.

U.S. Pat. No. 4,374,422 describes a road speed control device for commercial vehicles in which signals are subtracted from an amplified speed deviation signal which, at high rates of change in deviation or throttle motion, are established and decrease exponentially. This subtraction of the additional signals is intended to limit the control response and to stabilize control.

German Patent document DE 28 16 613 A1 describes a cruise control road speed control device in which the output signal of an acceleration control, wired in parallel with the speed controller, is subtracted from the output signal of the speed controller. The actuating signal thus formed is supplied first to a downstream actuator and second through a high-pass filter to the acceleration control with feedback. The acceleration control is intended to produce an improvement in the dynamic control behavior such that the desired set speed is reached more rapidly with changes in the actual speed. High-pass feedback is intended to ensure that changes in the set speed can be supplied to the actuator with a delay.

German Patent document DE 26 54 455 A1 describes a device for regulating the road speed of a motor vehicle, in which an actual speed signal and a set speed signal are supplied to the input of a speed controller. The speed controller delivers a controller output signal dependent thereon. The controller output signal is supplied to a throttle positioning member through a so-called Miller integrator stage, which causes any change in the controller output signal up to a predetermined amplitude to be passed on without delay or with a slight delay and to be delayed above this value.

For electronic control of Diesel fuel injection in motor vehicles with Diesel engines, it is especially important to provide an exact determination of the optimum fuel volume to be injected from the engine standpoint. The exact determination is made from the accelerator position by means of an associated position sensor, and from the engine rpm. The data on the fuel volume that must be injected for each state are usually displayed in an injection volume characteristic map. With a constant accelerator position and increasing engine rpm, the injection volume supplied by the characteristic map and, hence, the torque which the internal combustion engine can deliver, typically increases. Especially in vehicles with automatic transmissions having hydraulic torque converters, the following problem occurs. When the vehicle is at rest and the engine is running, the impeller of the converter that is connected to the engine turns, while the turbine wheel on the transmission side is at rest. At maximum engine rpm, the impeller and turbine wheels have approximately the same rpm, while during acceleration the turbine wheel is entrained by a hydraulic fluid by the rotation of the impeller. Between these two extreme states, consequently, there is a so-called slip range which reflects the difference in rpm between the impeller and turbine wheel and becomes narrower as engine rpm increases. When coasting, the functions of the impeller and turbine wheel are reversed with poorer efficiency so that the slip range increases in contrast to normal operation with acceleration. During the transition from coasting to acceleration, e.g. as the result of a transition from driving downhill to driving uphill, the width of the converter slip range can be 1000 rpm or more. During cruise control operation, this influences speed control especially at lower set speeds because the torque converter in the transmission, in the control range, acts as a lag or delay element. Especially at cruise control set speeds of up to 70 km/hour in fourth or fifth gear, the-engine rpm is in the range of high converter slip. When the vehicle is driving downhill, the engine is required to deliver little or no forward torque in order to maintain speed so that the engine rpm drops without this involving a decrease in speed. The decrease in rpm, because of the injection volume characteristic map, results in a further decrease in the volume injected, which in turn results in the actual speed dropping slightly below the set speed. As a result of the speed deviation, the cruise control delivers a signal that increases the volume injected, but because of converter slip this is initially felt only as an increase in rpm and not in speed. When the speed difference is corrected, the cruise control already has an output value that is too high, which results in a positive speed deviation, which triggers a subsequent counter-control by the cruise control. Therefore, the injection volume characteristic map with its rpm evaluation and the slip range of the transmission torque converter result in a direct feedback effect that favors oscillations in engine rpm. On a long downhill stretch, the instabilities in rpm that initially make themselves felt only acoustically and optically can build up and be felt as juddering of the vehicle.

There is therefore needed a cruise control road speed control device of the above-mentioned type which counteracts these engine rpm oscillations at low loads.

This need is met according to the present invention by a cruise control road speed control device for a motor vehicle with an internal combustion engine, especially a Diesel engine, including a speed control, a fuel injection volume adjusting member, and an attenuating member. The speed control receives on the input side an actual speed signal and a set speed signal and delivers at an output a controller output signal that depends on these input signals. The fuel injection volume adjusting member, on the basis of a preset injection volume characteristic map, delivers an injection volume control signal as a function of an input signal supplied to an input. The attenuating member is connected on the input side with the output of the speed control and on the output side with the input of the fuel injection volume adjusting member and delivers an output signal which is smaller, in a lower input signal value range, than its input signal.

By providing the attenuating member, a reduction in control amplification is actually achieved at low engine loads in the rpm range that is sensitive to rpm oscillations. The attenuation of the control output signal that is produced by the attenuating member in the lower value range counteracts the amplification of the cruise control's control output signal in the lower value range that is produced by the usual design of the injection volume characteristic map, in which, instead, cruise control value changes up to a factor of three are amplified by the injection volume characteristic map. As a result of this attenuation, the rpm oscillations that might otherwise occur in the lower value range of the controller output signal are reliably suppressed.

It is an advantage of the present invention that the attenuating member can be used in connection with any type of speed control and can consequently be used with great versatility for damping rpm oscillations in cruise controls.

The measure according to the present invention also does not require, for the required constant functional ability, relatively expensive smooth adjustments of the control parameters to reduce the control amplification. In addition, there is no feedback to the control that could interfere with its controlling property. Advantageously, no additional parameters such as engine rpm need to be processed to apply the device, and the injection volume characteristic map can be designed wholly on the basis of the engine standpoint without taking cruise control requirements into account.

In certain preferred embodiments, the attenuating member converts the control output signal into a signal that corresponds to the latter in an upper value range of the controller output signal. In a lower value range, the control output signal is smaller by a factor than the controller output signal which decreases monotonically from the value of one with a decreasing controller output signal so that the actual cruise control signal is attenuated very effectively in the low value range, that is, it is especially sensitive to rpm oscillations and consequently effectively opposes rpm oscillation.

Other objects, advantages and novel features of the present invention will become apparent from the following detailed description of the invention when considered in conjunction with the accompanying drawings.

DETAILED DESCRIPTION OF THE DRAWINGS

Figure 1:
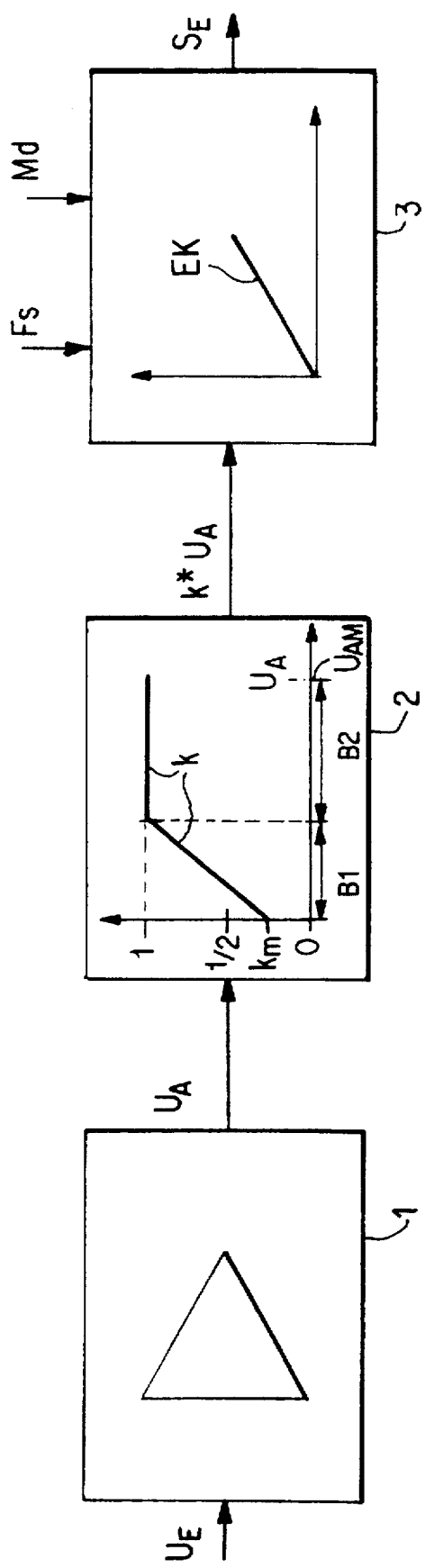
FIG. 1 is a block diagram of the part of a cruise control road speed control device according to the invention for a motor vehicle with electronic Diesel fuel control and automatic transmission.

The cruise control device in FIG. 1 includes a conventional analog control as the speed controller 1, an attenuating member 2 connected downstream therefrom, to which the output signal $U_A$ from the speed controller 1 is supplied on the input side, as well as a fuel injection volume adjusting member 3 that receives the output signal $(k.U_A)$ from the attenuating member 2. The attenuating member 3 delivers a corresponding injection volume control signal $S_E$ at its output.

Figure 2:
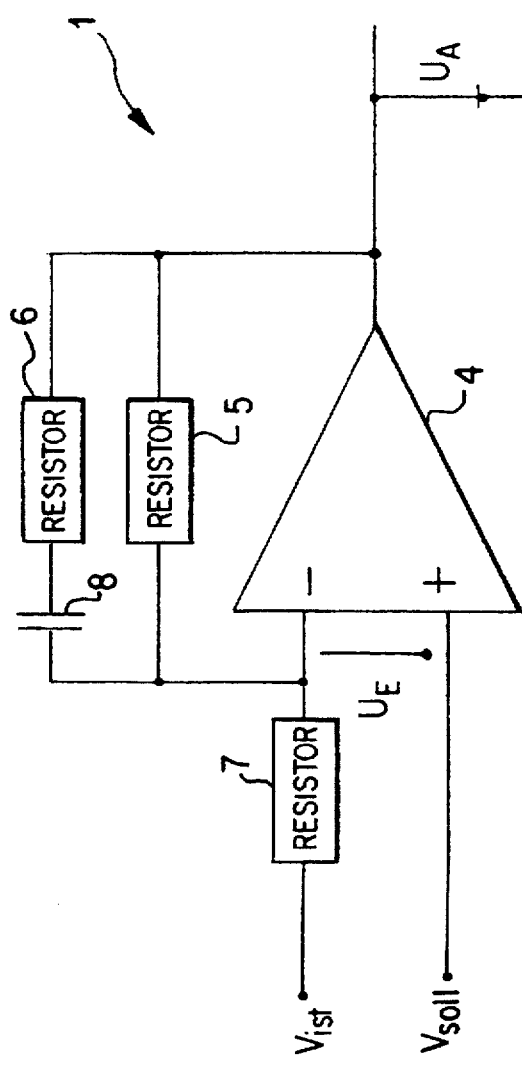
FIG. 2 is a block diagram of the cruise control circuit used in FIG. 1.

The structure of the speed controller 1 is shown in greater detail in FIG. 2. The speed controller 1 consists of an operational amplifier 4, to whose non-inverting input the set speed signal $v_{soll}$ is applied and to whose inverting input the actual speed signal $v_{ist}$ is applied through a resistor 7. This results in the control deviation signal $U_E$ on the input side of the operational amplifier 4. Control output signal $U_A$ then appears at the output of the operational amplifier 4. The output of the operational amplifier is fed back to the inverting operational amplifier input through a parallel circuit, one branch of which consists of a resistor 5 and the other branch consists of a series circuit composed of a resistor 6 and a capacitor 8.

The speed controller 1 with this design has a control response to a normalized set point step change, which consists of a static P amplification in the steady control state that is reached after a controller time constant has elapsed and of an instantaneous dynamic P amplification which typically amounts to 25% to 60% of the static P amplification. The control amplification rises from the instantaneous dynamic amplification value to the static amplification value within the controller time constant according to an exponential function.

The fuel injection volume adjusting member 3 generates the injection volume control signal SE for an actuator, located downstream and not shown, as a function of input values that are supplied on the basis of a previously supplied injection volume characteristic map EK (indicated only schematically in the corresponding functional block of FIG. 1), as is usual for electronic Diesel fuel injection systems. Particularly, the low input signal values are significantly amplified by the design of the injection volume characteristic map EK, for example in the range of less than 15% of the maximum input signal. In order to prevent rpm oscillations during cruise control operation under low engine loads because of such a considerable amplification of the low cruise control output signals, attenuating member 2 is connected in the loop between the speed control 1 and the fuel injection volume adjusting member 3. In addition to the output signal $(k.U_A)$ from attenuating member 2, the fuel injection volume adjusting member 3 receives engine rpm information Md as well as accelerator position information Fs as input parameters, with the accelerator position value having no influence as long as the attenuating member 2 delivers an output signal $(k.U_A)$ which is larger.

Attenuating member 2 multiplies the controller output signal $U_A$ supplied on the input side by a factor of k to produce the output signal $(k.U_A)$ which is supplied as an input signal to fuel injection volume adjusting member 3. Multiplication factor k is determined by a characteristic as shown in the function block of attenuating member 2 in FIG. 1. The factor k depends on the input signal, i.e. the controller output signal $U_A$, constantly assuming the value of one in an upper value range B2 between approximately 42% and 100% of the maximum controller output signal $U_{AM}$. In this upper input signal value range B2 of the controller output signal $U_A$, the latter is consequently passed unchanged by the attenuating member 2 to the fuel injection volume adjusting member 3 as a control signal. From the lower cutoff point of the upper input signal value range B2, the multiplication factor k then constantly decreases monotonically with decreasing input signal $U_A$ until it reaches its minimum value $k_m$ which is, for example approximately 0.25, at the minimum value zero of input signal $U_A$. The exact response in this lower input signal value range B1 of controller output signal $U_A$ in which attenuation factor k remains less than one, can be determined empirically for example depending on the application. To save on memory locations, this response can be predetermined by a few supporting points with linear interpolation between them. In addition, depending on the application, the minimum value $k_m$ of factor k as well as the position of the cutoff point between the lower value range B1 and the upper input signal value range B2 of the controller output signal $U_A$ can be chosen appropriately.

In any event, the location of the attenuating member according to the invention between the cruise control and the fuel injection volume adjusting member permits effective damping of rpm oscillations during cruise control operation with a low engine load, with the cruise control being of conventional design without any changes being required in the cruise control itself Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cruise control road speed control device for a motor vehicle having an internal combustion engine, comprising:
   a speed control which receives on an input side an actual speed signal and a set speed signal, and delivers at an output a controller output signal that depends on said actual speed signal and said speed signal;
   a fuel injection volume adjusting member which delivers an injection volume control signal as a function of an input signal thereto, based on a preset injection volume characteristic map; and
   an attenuating member having an input side connected with the output of the speed control and an output side with the input of the fuel injection volume adjusting member, said attenuating member delivering an output signal which, in a lower input signal value range, is smaller than the controller output signal provided as an input signal to said attenuating member.

2. A cruise control road speed control device according to claim 1, wherein the attenuating member generates the output signal by multiplying its input signal by a factor which depends on the input signal, said factor increasing constantly and monotonically in the lower input signal value range from a predetermined minimum value with a rising input signal, to and remaining at a value of one in a continuing upper input signal value range.

3. A cruise control road speed control device according to claim 1, wherein said internal combustion engine is a Diesel engine.

4. For use with a vehicle speed control system having an input for a desired vehicle speed, a sensor for detecting actual vehicle speed, a speed control unit which generates a control signal as a function of a difference between said desired vehicle speed and said actual vehicle speed, and a fuel injection volume adjusting device which generates an injection volume control signal as a function of an input signal thereto, a device for modifying a response of said system to changes in said difference, said device comprising:
   an attenuation member having an input for receiving said control signal generated by said speed control unit, and an output for supplying an input signal to said fuel injection volume adjusting device, said attenuation unit delivering a signal at said output which, in a lower input signal value range, is smaller than the control signal received from the speed control unit.

5. A cruise control road speed control device according to claim 4, wherein the attenuating member generates an output signal by multiplying its input signal by a factor which depends on the input signal, said factor increasing constantly and monotonically in the lower input signal value range from a predetermined minimum value with a rising input signal, to and remaining at a value of one in a continuing upper input signal value range.

* * * * *